US010473127B2

(12) United States Patent
Ohshiro et al.

(10) Patent No.: US 10,473,127 B2
(45) Date of Patent: Nov. 12, 2019

(54) FAN DRIVE SYSTEM AND MANAGEMENT SYSTEM

(71) Applicant: Komatsu Ltd., Tokyo (JP)

(72) Inventors: Mitsuru Ohshiro, Tokyo (JP); Kenichi Ogasawara, Tokyo (JP); Masahiro Hirano, Tokyo (JP)

(73) Assignee: Komatsu LTD., Tokyo (JP)

( * ) Notice: Subject to any disclaimer, the term of this patent is extended or adjusted under 35 U.S.C. 154(b) by 310 days.

(21) Appl. No.: 15/526,821

(22) PCT Filed: Jan. 12, 2017

(86) PCT No.: PCT/JP2017/000818
§ 371 (c)(1),
(2) Date: May 15, 2017

(87) PCT Pub. No.: WO2018/131118
PCT Pub. Date: Jul. 19, 2018

(65) Prior Publication Data
US 2019/0093684 A1 Mar. 28, 2019

(51) Int. Cl.
*F15B 19/00* (2006.01)
*F01P 7/04* (2006.01)
(Continued)

(52) U.S. Cl.
CPC ............ *F15B 19/005* (2013.01); *F01P 7/044* (2013.01); *F04B 49/20* (2013.01); *F04B 51/00* (2013.01);
(Continued)

(58) Field of Classification Search
None
See application file for complete search history.

(56) References Cited

U.S. PATENT DOCUMENTS 6,311,488 B1 11/2001 Maruta et al.
6,328,000 B1 * 12/2001 Hawkins .................. F01P 7/04 123/41.12
(Continued)

FOREIGN PATENT DOCUMENTS

DE 100 19 606 A1 12/2000
DE 60 2004 009 349 T2 7/2008
(Continued)

OTHER PUBLICATIONS

International Search Report and Written Opinion dated Mar. 7, 2017, issued for PCT/JP2017/000818.
(Continued)

*Primary Examiner* — Thomas E Lazo
*Assistant Examiner* — Michael Quandt
(74) *Attorney, Agent, or Firm* — Locke Lord LLP

(57) ABSTRACT

A fan drive system includes a hydraulic pump, a hydraulic motor that rotates a fan on the basis of hydraulic oil supplied from the hydraulic pump, a data acquisition unit that acquires an actual fan speed of the fan, a target amount determination unit that determines a target fan speed of the fan on the basis of a state of an object to be cooled of the fan, and an estimating unit that estimates a state of the hydraulic pump or a state of the hydraulic motor on the basis of a change of a feedback amount that indicates a difference between the target fan speed and the actual fan speed.

10 Claims, 10 Drawing Sheets

(51) Int. Cl.

| | |
|---|---|
| ***F04B 49/20*** | (2006.01) |
| ***F15B 21/02*** | (2006.01) |
| ***F04B 51/00*** | (2006.01) |
| *E02F 9/20* | (2006.01) |
| *E02F 9/26* | (2006.01) |

(52) U.S. Cl.

CPC ............ *F15B 21/02* (2013.01); *E02F 9/2054* (2013.01); *E02F 9/267* (2013.01)

(56) References Cited

U.S. PATENT DOCUMENTS

| | | | | |
|---|---|---|---|---|
| 6,481,388 | B1 | 11/2002 | Yamamoto | |
| 7,607,296 | B2 * | 10/2009 | Ohigashi ............... | E02F 9/2235<br>60/431 |
| 8,632,314 | B2 * | 1/2014 | Imaizumi ................ | F01P 7/044<br>123/41.12 |
| 8,844,279 | B2 * | 9/2014 | Nelson .................. | F16H 61/438<br>60/456 |
| 2004/0060206 | A1 | 4/2004 | Ichimura | |
| 2013/0227939 | A1 | 9/2013 | Hornberg et al. | |

FOREIGN PATENT DOCUMENTS

| | | | |
|---|---|---|---|
| DE | 10 2012 101 806 | A1 | 9/2013 |
| EP | 1452705 | A1 | 9/2004 |
| EP | 1361378 | B1 | 5/2009 |
| JP | 05-26211 | A | 2/1993 |
| JP | 09-14120 | A | 1/1997 |
| JP | 2000-130164 | A | 5/2000 |
| JP | 2009-162350 | A | 7/2009 |
| WO | 02/057662 | A1 | 7/2002 |

OTHER PUBLICATIONS

Office Action dated Aug. 16, 2018, issued for the corresponding German patent application No. 11 2017 000 002.5.

* cited by examiner

FAN DRIVE SYSTEM AND MANAGEMENT SYSTEM

FIELD

The present invention relates to a fan drive system and a management system.

BACKGROUND

A construction machine includes an engine, a hydraulic pump driven by power generated by the engine, a hydraulic cylinder driven by hydraulic oil discharged from the hydraulic pump, and a work machine operated by the hydraulic cylinder. A water cooling-type cooling device is used to cool the engine. An oil cooler is used to cool the hydraulic oil. The water cooling-type cooling device cools the engine by circulating cooling water in a circulation system including a jacket and a radiator provided in the engine. The hydraulic oil is cooled by being circulated in a circulation system including the oil cooler. The radiator and the oil cooler are cooled by a cooling fan. The radiator and the oil cooler are cooled by wind generated by the fan, so that the cooling water and the hydraulic oil are cooled.

An example of a fan drive device that drives a fan by oil pressure is disclosed in Patent Literature 1. In Patent Literature 1, the fan drive device includes a hydraulic pump driven by power generated by an engine and a hydraulic motor that rotates the fan on the basis of hydraulic oil supplied from the hydraulic pump.

CITATION LIST

Patent Literature

Patent Literature 1: JP 2000-130164 A

SUMMARY

Technical Problem

In the fan drive system as hydraulic equipment, when abnormality such as contamination of the hydraulic oil, deterioration of the hydraulic oil, abrasion or deterioration of a component of the hydraulic pump due to mixture of water to the hydraulic oil, or abrasion or deterioration of a component of a hydraulic motor occurs, efficiency of the fan drive system is decreased. If the efficiency of the fan drive system is decreased and a fan speed is decreased, the cooling water and the hydraulic oil are not sufficiently cooled, and overheat may occur without any prior warning especially in a construction machine having less room for heat balance. As a result, operation of the construction machine is forced to be stopped, leading to a decrease in productivity in the construction site. Therefore, a technology that enables an easy grasp of the decrease in the efficiency of the fan drive system before the fan speed is decreased is desired.

Further, an overhaul time is set to the fan drive system. The overhaul time is often set to a plurality of fan drive systems in a single uniform way. However, a use environment of the fan drive system differs in every construction machine on which the fan drive system is mounted. Therefore, in a case of overhauling the fan drive systems in the overhaul time set in a single uniform way, a case may occur, in which the overhaul of the fan drive system is conducted even when the fan drive system can be continuously used.

Further, a main cause of the decrease in the efficiency of the fan drive system is the contamination of the hydraulic oil. The contamination state of the hydraulic oil can be grasped by providing a contamination sensor that can detect the contamination of the hydraulic oil in the fan drive system and analyzing the hydraulic oil. However, providing the contamination sensor increases the cost of the fan drive system. Further, to accurately analyze the hydraulic oil, collection of the hydraulic oil agitated during the operation of the fan drive system is favorable. However, collection of the hydraulic oil during the operation of the fan drive system is not easy, and accurate analysis of the hydraulic oil is difficult.

An objective of an aspect of the present invention is to provide a fan drive system and a management system of which a decrease in efficiency can be easily grasped.

Solution to Problem

According to a first aspect of the present invention, a fan drive system comprises: a hydraulic pump; a hydraulic motor configured to rotate a fan on the basis of hydraulic oil supplied from the hydraulic pump; a data acquisition unit configured to acquire an actual fan speed of the fan; a target amount determination unit configured to determine a target fan speed of the fan on the basis of a state of an object to be cooled of the fan; and an estimating unit configured to estimate a state of the hydraulic pump or a state of the hydraulic motor on the basis of a change of a feedback amount indicating a deviation between the target fan speed and the actual fan speed.

According to a second aspect of the present invention, a management system, comprises: a server configured to be able to communicate with the fan drive system according to the first aspect, and configured to acquire a plurality of the feedback amounts from a plurality of the fan drive systems, respectively, wherein the server compares the feedback amounts respectively acquired from the fan drive systems with one another, and extracts a specific fan drive system.

Advantageous Effects of Invention

According to an aspect of the present invention, a fan drive system and a management system of which a decrease in efficiency can be easily grasped can be provided.

DESCRIPTION OF EMBODIMENTS

Hereinafter, embodiments according to the present invention will be described with reference to the drawings. However, the present invention is not limited thereto. Configuration elements of the embodiments described below can be appropriately combined. Further, a part of the configuration elements may not be used.

First Embodiment

[Outline of Fan Drive System]

Figure 1:
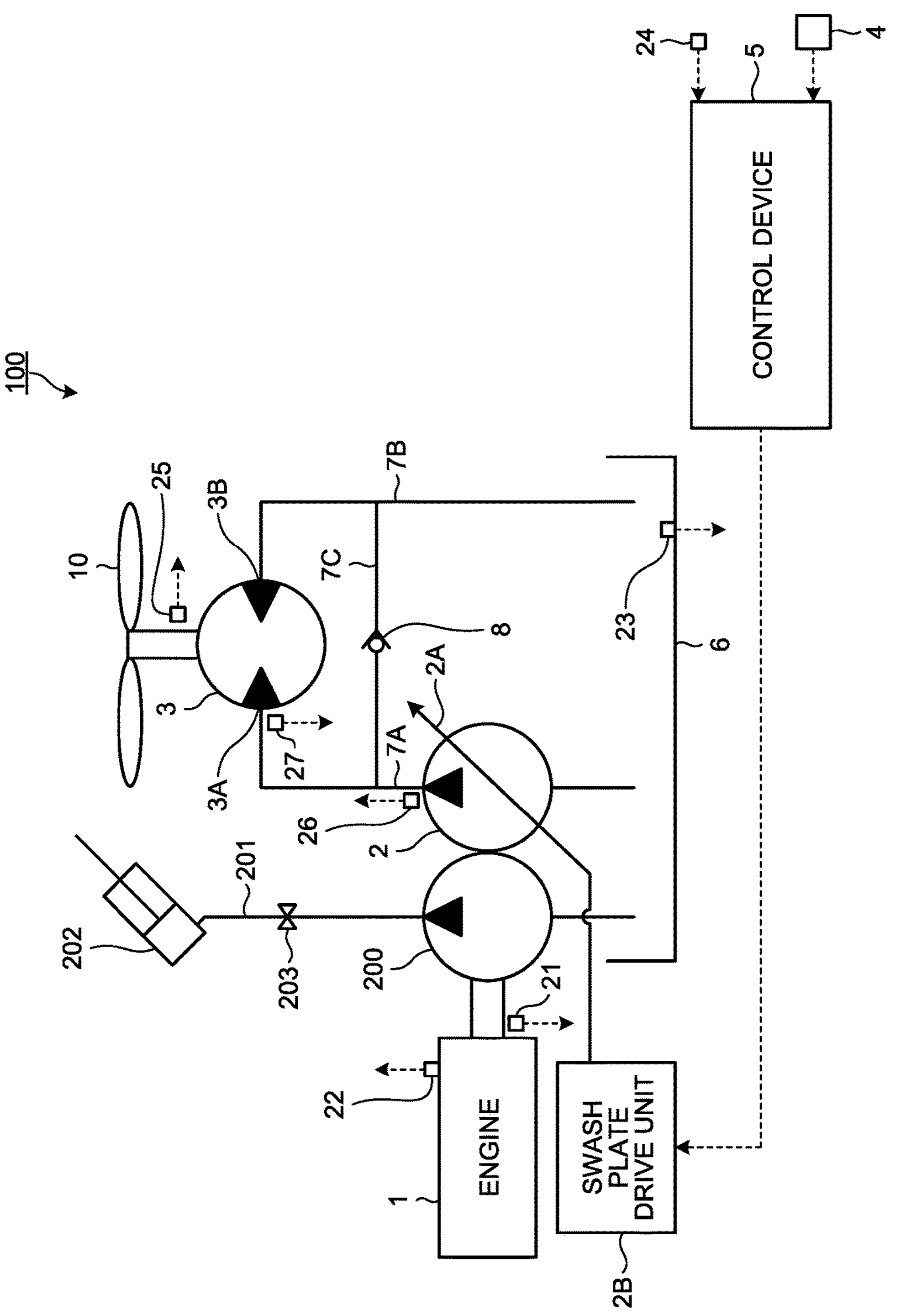
FIG. 1 is a diagram schematically illustrating an example of a fan drive system according to a first embodiment.

A first embodiment will be described. FIG. 1 is a diagram schematically illustrating an example of a fan drive system 100 according to the present embodiment. The fan drive system 100 is mounted on a construction machine having an engine 1 and a hydraulic cylinder 202, such as an excavator. The fan drive system 100 rotates a fan 10. When the fan 10 is rotated, a radiator and an oil cooler are cooled. When the radiator and the oil cooler are cooled, cooling water and hydraulic oil of the engine 1 are cooled.

As illustrated in FIG. 1, the fan drive system 100 includes a fan drive hydraulic pump 2 driven by power generated by the engine 1, a fan drive hydraulic motor 3 that rotates the fan 10 on the basis of the hydraulic oil supplied from the hydraulic pump 2, an input device 4, and a control device 5. The fan 10 is rotated by power generated by the hydraulic motor 3.

Further, the fan drive system 100 includes an engine speed sensor 21 that detects an engine speed of the engine 1, an engine water temperature sensor 22 that detects a temperature of the cooling water of the engine 1, a hydraulic oil temperature sensor 23 that detects a temperature of the hydraulic oil, an ambient temperature sensor 24 that detects an ambient temperature as an external temperature of the construction machine, a fan speed sensor 25 that detects a fan speed of the fan 10, a discharge pressure sensor 26 that detects a discharge pressure of the hydraulic pump 2, and an inflow port pressure sensor 27 that detects an inflow port pressure of the hydraulic motor 3.

The hydraulic pump 2 is a power source of the hydraulic motor 3. The hydraulic pump 2 is connected with an output shaft of the engine 1, and is driven by the power generated by the engine 1. The hydraulic pump 2 is a variable displacement hydraulic pump. In the present embodiment, the hydraulic pump 2 is a swash plate-type piston pump. The hydraulic pump 2 includes a swash plate 2A and a swash plate drive unit 2B that drives the swash plate 2A. The swash plate drive unit 2B adjusts an angle of the swash plate 2A to adjust a capacity q of the hydraulic pump 2.

The hydraulic pump 2 sucks the hydraulic oil stored in a hydraulic oil tank 6, and discharges the hydraulic oil through a discharge port. The hydraulic oil discharged from the hydraulic pump 2 is supplied to the hydraulic motor 3 through a pipeline 7A.

The hydraulic motor 3 is a power source of the fan 10. The hydraulic motor 3 is a fixed displacement hydraulic motor. The hydraulic motor 3 includes an inflow port 3A connected with the pipeline 7A, an outflow port 3B connected with a pipeline 7B, and an output shaft to which the fan 10 is connected.

The hydraulic oil discharged from the hydraulic pump 2 flows into the inflow port 3A of the hydraulic motor 3 through the pipeline 7A. The output shaft of the hydraulic motor 3 is rotated on the basis of the hydraulic oil flowing into the inflow port 3A. When the output shaft of the hydraulic motor 3 is rotated, the fan 10 connected to the output shaft of the hydraulic motor 3 is rotated. The hydraulic oil flowing out through the outflow port 3B of the hydraulic motor 3 is returned to the hydraulic oil tank 6 through the pipeline 7B.

Note that the inflow port 3A of the hydraulic motor 3 and the hydraulic oil tank 6 are connected through a pipeline 7C. The pipeline 7C is provided with a check valve 8 that guides the hydraulic oil only in one direction from the hydraulic oil tank 6 toward the inflow port 3A of the hydraulic motor 3. The check valve 8 guides the hydraulic oil through the outflow port 3B of the hydraulic motor 3 and the hydraulic oil in the hydraulic oil tank 6 to the inflow port 3A of the hydraulic motor 3 to suppress occurrence of cavitation, when the pressure of the hydraulic motor 3 is decreased due to a pump action occurring when supply of the hydraulic oil from the hydraulic pump 2 is suddenly decreased. When the hydraulic motor 3 is rapidly decelerated, the hydraulic oil from the hydraulic pump 2 and the hydraulic oil from the hydraulic oil tank 6 are supplied to the inflow port 3A of the hydraulic motor 3.

The engine speed sensor 21 detects the engine speed of the engine 1 per unit time. The engine speed sensor 21 can detect a speed of an input shaft of the hydraulic pump 2 by detecting a speed of the output shaft of the engine 1. Detection data of the engine speed sensor 21 is output to the control device 5.

The engine water temperature sensor 22 detects the temperature of the cooling water that cools the engine 1. The engine water temperature sensor 22 detects the temperature of the cooling water of a jacket of the engine 1. Detection data of the engine water temperature sensor 22 is output to the control device 5.

The hydraulic oil temperature sensor 23 detects the temperature of the hydraulic oil of the fan drive system 100. The hydraulic oil temperature sensor 23 is provided in the hydraulic oil tank 6. In the present embodiment, a main hydraulic pump 200 and the hydraulic cylinder 202 use the hydraulic oil in the hydraulic oil tank 6. That is, the temperature of the hydraulic oil of the fan drive system 100 and the temperature of the hydraulic oil of the main hydraulic pump 200 and the hydraulic cylinder 202 are substantially equal. The hydraulic oil temperature sensor 23 can detect the temperature of the hydraulic oil of the main hydraulic pump 200 and the hydraulic cylinder 202 by detecting the temperature of the hydraulic oil of the fan drive system 100. Detection data of the hydraulic oil temperature sensor 23 is output to the control device 5.

Further, the ambient temperature sensor 24 detects the external temperature of the construction machine. The external temperature of the construction machine means an external temperature of the fan drive system 100, an external temperature of the engine 1, an external temperature of the main hydraulic pump 200, and an external temperature of the hydraulic cylinder 202. In other words, the external temperature of the construction machine means an environmental temperature at which the cooling water of the engine 1 is used, and an environmental temperature at which the hydraulic oil is used. Detection data of the ambient temperature sensor 24 is output to the control device 5.

The fan speed sensor 25 detects the fan speed of the fan 10 per unit time. The fan speed sensor 25 is provided to the output shaft of the hydraulic motor 3. In the description below, the fan speed of the fan 10 detected by the fan speed sensor 25 is appropriately referred to as an actual fan speed Fs of the fan 10. Detection data of the fan speed sensor 25 is output to the control device 5.

The discharge pressure sensor 26 is a pressure sensor that detects a discharge pressure of the hydraulic oil from the hydraulic pump 2. The inflow port pressure sensor 27 is a pressure sensor that detects an inflow port pressure of the hydraulic oil flowing into the inflow port 3A of the hydraulic motor 3.

The input device 4 is operated by an operator. The input device 4 includes a computer keyboard, a touch panel, and an operation board having operation buttons. The input device 4 generates input data by being operated. The input data generated by the input device 4 is output to the control device 5.

The control device 5 controls the swash plate drive unit 2B on the basis of the detection data of the engine speed sensor 21, the detection data of the engine water temperature sensor 22, the detection data of the hydraulic oil temperature sensor 23, the detection data of the ambient temperature sensor 24, and the detection data of the fan speed sensor 25. The control device 5 controls the swash plate drive unit 2B to adjust a flow rate Q of the hydraulic oil supplied from the hydraulic pump 2 to the hydraulic motor 3.

A relationship of the following formula (1) is established among the capacity q [cc/rev] per one rotation of the hydraulic pump 2, the flow rate Q of the hydraulic oil discharged from the hydraulic pump 2, and an engine speed N. Note that K is efficiency in the formula (1).

$$Q=K\times q\times N \tag{1}$$

Therefore, in a case where the engine 1 is rotated at the fixed engine speed N, the control device 5 controls the swash plate drive unit 2B to adjust the angle of the swash plate 2A to adjust the capacity q, thereby to adjust the flow rate Q of the hydraulic oil supplied from the hydraulic pump 2 to the hydraulic motor 3.

The fan speed of the fan 10 is adjusted on the basis of the flow rate Q of the hydraulic oil supplied from the hydraulic pump 2 to the hydraulic motor 3. In the present embodiment, the hydraulic pump 2 is a variable displacement hydraulic pump. The flow rate Q of the hydraulic oil flowing into the inflow port 3A and the fan speed of the fan 10 connected to the output shaft of the hydraulic motor 3 are proportional. The fan speed of the fan 10 becomes higher as the flow rate Q of the hydraulic oil supplied from the hydraulic pump 2 to the hydraulic motor 3 is larger. The fan speed of the fan 10 becomes lower as the flow rate Q of the hydraulic oil supplied from the hydraulic pump 2 to the hydraulic motor 3 is small. In a case where the hydraulic oil is not supplied from the hydraulic pump 2 to the hydraulic motor 3, rotation of the fan 10 is stopped.

The engine 1 is connected with the main hydraulic pump 200. The main hydraulic pump 200 is driven by the power generated in the engine 1. The main hydraulic pump 200 sucks the hydraulic oil stored in the hydraulic oil tank 6 and discharges the hydraulic oil through the discharge port. The hydraulic oil discharged from the main hydraulic pump 200 is supplied to the hydraulic cylinder 202 through a pipeline 201. The hydraulic cylinder 202 is an actuator driven on the basis of the hydraulic oil supplied from the main hydraulic pump 200. Further, a valve 203 is provided in the pipeline 201 in which the hydraulic oil supplied from the main hydraulic pump 200 flows. The valve 203 adjusts a supply amount per unit time of the hydraulic oil supplied to the hydraulic cylinder 202. A work machine of the construction machine is operated by driving of the hydraulic cylinder 202. The hydraulic oil discharged from the hydraulic cylinder 202 is returned to the hydraulic oil tank 6.

[Control Device]

Figure 2:
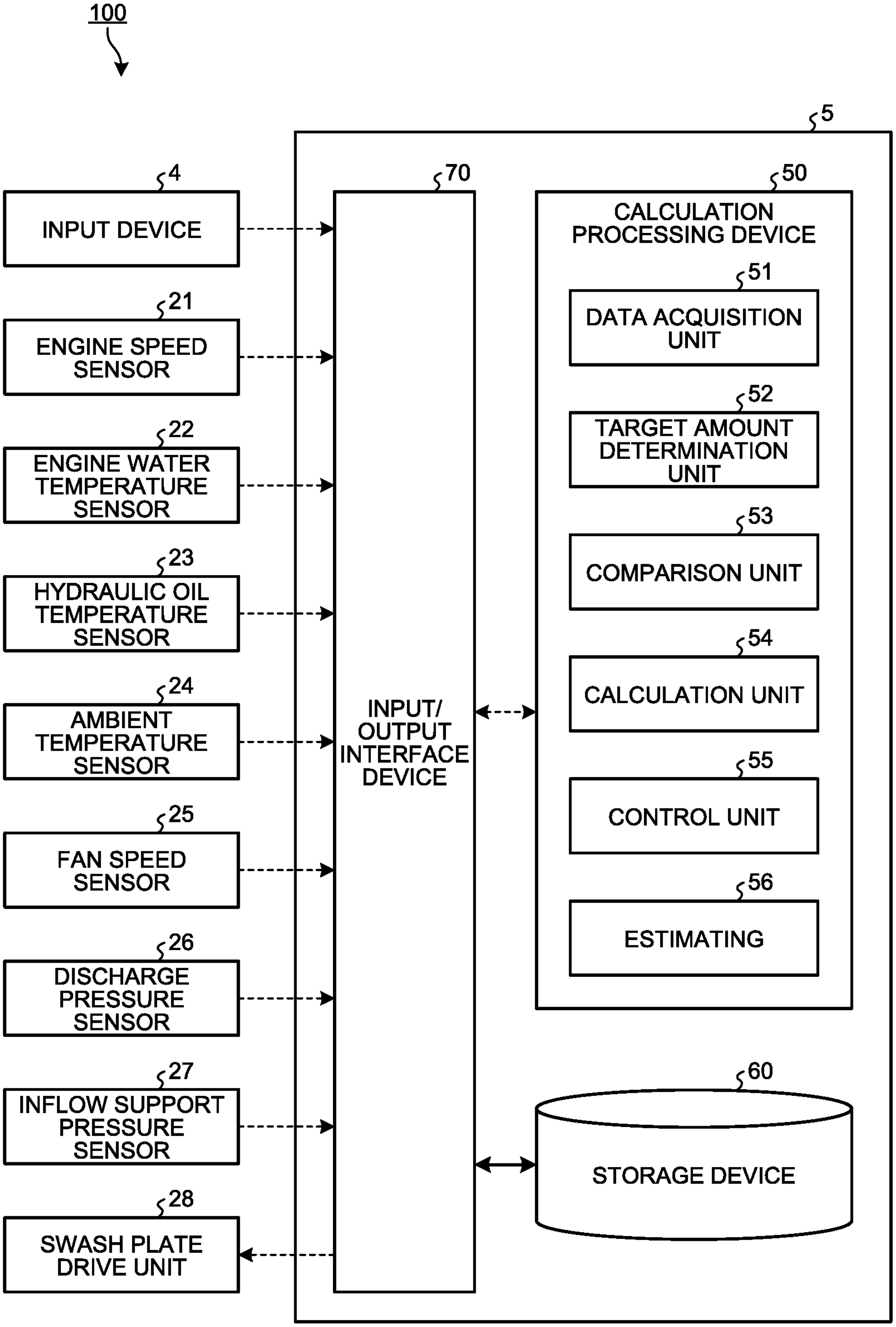
FIG. 2 is a functional block diagram illustrating an example of the fan drive system according to the first embodiment.

Next, a control system of the fan drive system 100 according to the present embodiment will be described. FIG. 2 is a functional block diagram illustrating an example of the fan drive system 100 according to the present embodiment.

The control device 5 includes a computer system. The control device 5 includes a calculation processing device 50, a storage device 60, and an input/output interface device 70.

The calculation processing device 50 includes a microprocessor such as a central processing unit (CPU). The storage device 60 includes a memory and a storage such as a read only memory (ROM) or a random access memory (RAM). The calculation processing device 50 performs calculation processing according to a computer program stored in the storage device 60.

The input/output interface device 70 is connected with the calculation processing device 50, the storage device 60, the input device 4, the engine speed sensor 21, the engine water temperature sensor 22, the hydraulic oil temperature sensor 23, the ambient temperature sensor 24, the fan speed sensor 25, the discharge pressure sensor 26, the inflow port pressure sensor 27, and the swash plate drive unit 2B. The input/output interface device 70 performs data communication with the calculation processing device 50, the storage device 60, the input device 4, the engine speed sensor 21, the engine water temperature sensor 22, the hydraulic oil temperature sensor 23, the ambient temperature sensor 24, the fan speed sensor 25, the discharge pressure sensor 26, the inflow port pressure sensor 27, and the swash plate drive unit 2B.

The calculation processing device 50 includes a data acquisition unit 51, a target amount determination unit 52, a comparison unit 53, a calculation unit 54, a control unit 55, and an estimating unit 56.

The data acquisition unit 51 acquires engine speed data, which indicates the engine speed of the engine 1 per unit time, from the engine speed sensor 21. Further, the data acquisition unit 51 acquires engine water temperature data, which indicates the temperature of the cooling water of the engine 1, from the engine water temperature sensor 22. Further, the data acquisition unit 51 acquires hydraulic oil temperature data, which indicates the temperature of the hydraulic oil, from the hydraulic oil temperature sensor 23. Further, the data acquisition unit 51 acquires ambient temperature data, which indicates the external temperature of the construction machine, from the ambient temperature sensor 24. Further, the data acquisition unit 51 acquires fan speed data, which indicates the actual fan speed Fs of the fan 10 per unit time, from the fan speed sensor 25. Further, the data acquisition unit 51 acquires pressure data that indicates the discharge pressure of the hydraulic pump 2 and is detected by the discharge pressure sensor 26. Further, the data acquisition unit 51 acquires pressure data that indicates the inflow port pressure of the hydraulic motor 3 and is detected by the inflow port pressure sensor 27.

The target amount determination unit 52 determines a target fan speed Fr of the fan 10 on the basis of a state of an object to be cooled of the fan 10. In the present embodiment, the objects to be cooled of the fan 10 are the cooling water and the hydraulic oil. The state of the object to be cooled includes at least one of the engine speed of the engine 1 cooled by the cooling water, the temperature of the cooling water, the temperature of the hydraulic oil, and the external temperature of the construction machine, which is an environmental temperature at which the cooling water and the hydraulic oil are used. That is, the target amount determination unit 52 determines the target fan speed Fr of the fan 10 on the basis of the data acquired by the data acquisition unit 51.

The state of the object to be cooled of the fan 10 is changed from hour to hour on the basis of the operation state of the construction machine, the environmental temperature, and the like. Therefore, the target fan speed Fr of the fan 10 determined by the target amount determination unit 52 is changed from hour to hour on the basis of the operation state of the construction machine, the environmental temperature, and the like.

The comparison unit 53 compares the target fan speed Fr of the fan 10 determined in the target amount determination unit 52 and the actual fan speed Fs of the fan 10 acquired by the data acquisition unit 51. In the present embodiment, the comparison unit 53 calculates a feedback amount that indicates a deviation between the target fan speed Fr and the actual fan speed Fs of the fan 10.

The calculation unit 54 adds the feedback amount that indicates the deviation between the target fan speed Fr and the actual fan speed Fs calculated by the comparison unit 53 to the target fan speed Fr to calculate a command fan speed Ft. The command fan speed Ft is a speed for controlling the swash plate drive unit 2B of the hydraulic pump 2. The feedback amount includes a deviation between the target fan speed Fr and the command fan speed Ft.

The control unit 55 controls the swash plate drive unit 2B on the basis of the command fan speed Ft. In the present embodiment, the control unit 55 calculates a control current i of the swash plate drive unit 2B so that the fan 10 is rotated at the command fan speed Ft. The swash plate drive unit 2B is driven on the basis of the control current i calculated by the control unit 55 to adjust the angle of the swash plate 2A.

The estimating unit 56 estimates a state of the hydraulic pump 2 or a state of the hydraulic motor 3 on the basis of a change of the feedback amount that indicates the deviation between the target fan speed Fr and the actual fan speed Fs of the fan 10. In the present embodiment, the state of the hydraulic pump 2 or the state of the hydraulic motor 3 include system efficiency that indicates the product of volume efficiency of the hydraulic pump 2 and volume efficiency of the hydraulic motor 3. The estimating unit 56 estimates the system efficiency on the basis of a change of the feedback amount.

Further, the estimating unit 56 estimates a state of the hydraulic cylinder 202 or a state of the valve 203 on the basis of the change of the feedback amount. The state of the hydraulic cylinder 202 includes a state in which a configuration component of the hydraulic cylinder 202 is worn away due to long term use, and leakage of the oil through a gap in the configuration component is caused. The state of the valve 203 includes a state in which a configuration component of the valve 203 is worn away due to long term use, and leakage of the oil through a gap in the configuration component is caused.

The storage device 60 stores a plurality of correlation data about the target fan speed Fr of the fan 10. The correlation data is obtained through an experiment or a simulation in advance.

Figure 3:
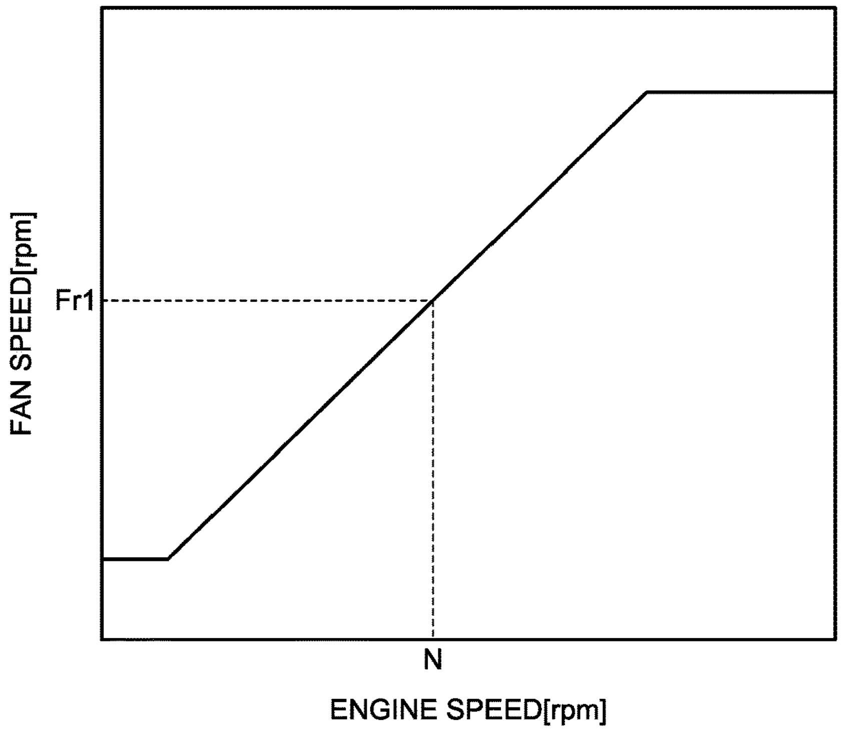
FIG. 3 is a diagram illustrating an example of first correlation data indicating a relationship between an engine speed and a target fan speed of a fan according to the first embodiment.

The storage device 60 stores first correlation data that indicates a relationship between the engine speed N and a target fan speed Fri of the fan 10 that is required at the engine speed N. FIG. 3 is a diagram illustrating an example of the first correlation data according to the present embodiment. The first correlation data indicates the target fan speed Fr1 of the fan 10 at which the hydraulic oil is optimally cooled at the certain engine speed N. At the certain engine speed N, the hydraulic oil is optimally cooled as the fan 10 is rotated at the target fan speed Fr1 corresponding to the engine speed N on the basis of the first correlation data.

Figure 4:
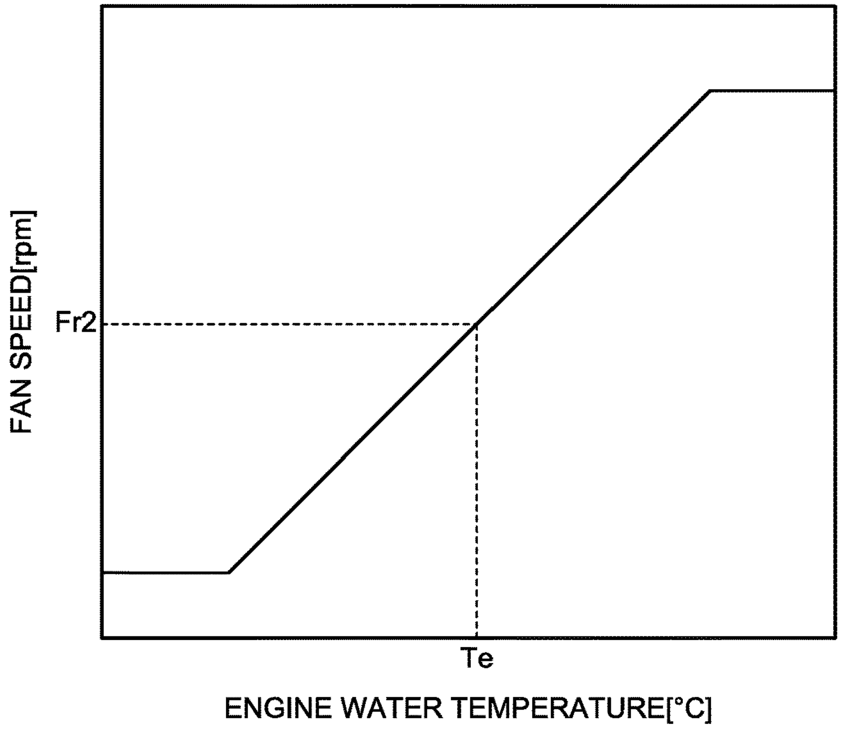
FIG. 4 is a diagram illustrating an example of second correlation data indicating a relationship between an engine water temperature and the target fan speed of the fan according to the first embodiment.

Further, the storage device 60 stores second correlation data that indicates a relationship between an engine water temperature Te and a target fan speed Fr2 of the fan 10 that is required at the engine water temperature Te. FIG. 4 is a diagram illustrating an example of the second correlation data according to the present embodiment. The second correlation data indicates the target fan speed Fr2 of the fan 10 at which the cooling water is optimally cooled at the certain engine water temperature Te. At the certain engine water temperature Te, the cooling water is optimally cooled as the fan 10 is rotated at the target fan speed Fr2 corresponding to the engine water temperature Te on the basis of the second correlation data.

Figure 5:
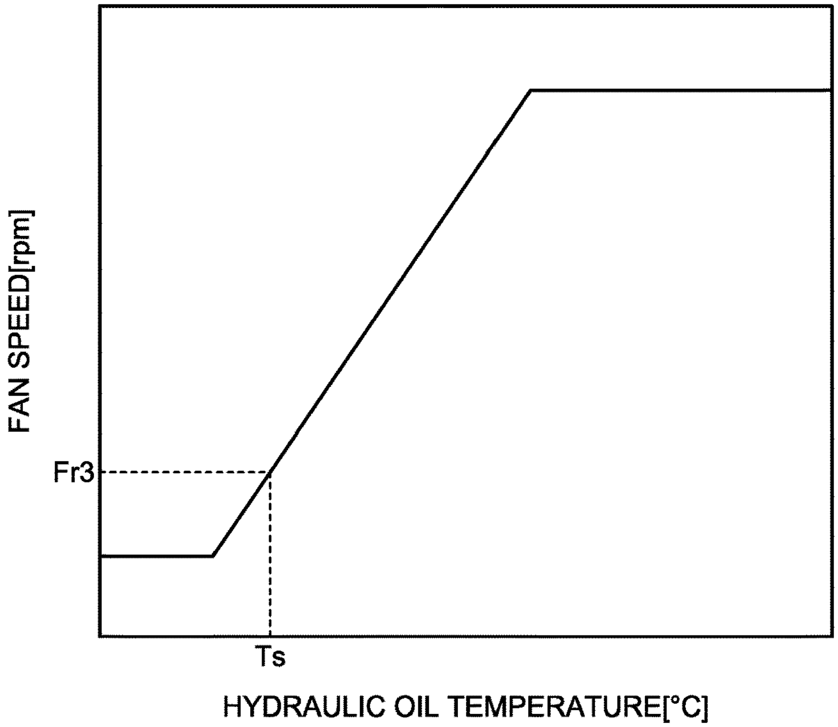
FIG. 5 is a diagram illustrating an example of third correlation data indicating a relationship between a hydraulic oil temperature and the target fan speed of the fan according to the first embodiment.

Further, the storage device 60 stores third correlation data that indicates a relationship between a hydraulic oil temperature Ts and a target fan speed Fr3 of the fan 10 that is required at the hydraulic oil temperature Ts. FIG. 5 is a diagram illustrating an example of the third correlation data according to the present embodiment. The third correlation data indicates the target fan speed Fr3 of the fan 10 at which the hydraulic oil is optimally cooled at the certain hydraulic oil temperature Ts. At the certain hydraulic oil temperature Ts, the hydraulic oil is optimally cooled as the fan 10 is rotated at the target fan speed Fr3 corresponding to the hydraulic oil temperature Ts on the basis of the third correlation data.

Figure 6:
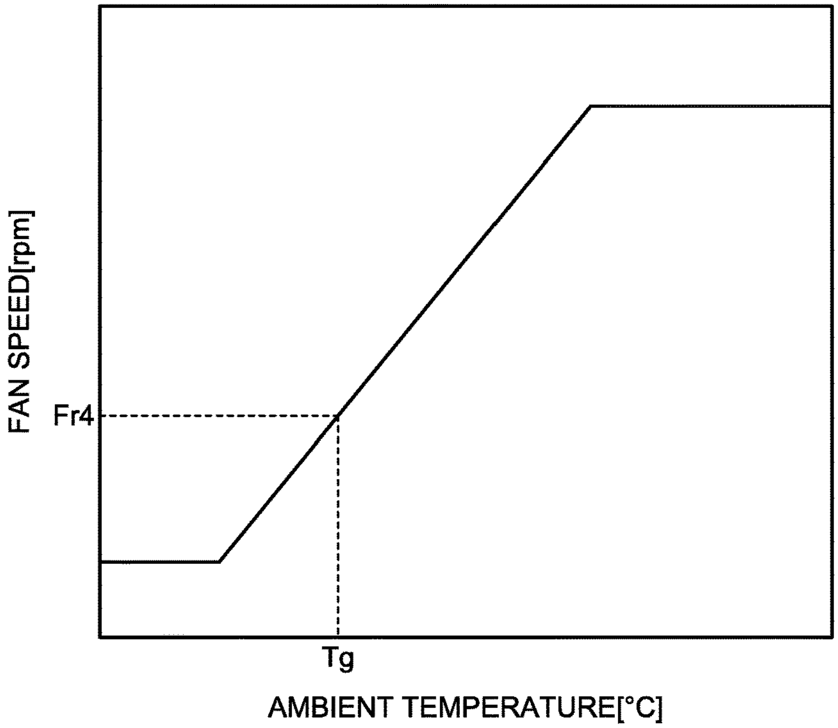
FIG. 6 is a diagram illustrating an example of fourth correlation data indicating a relationship between an ambient temperature and the target fan speed of the fan according to the first embodiment.

Further, the storage device 60 stores fourth correlation data that indicates a relationship between an ambient temperature Tg and a target fan speed Fr4 of the fan 10 that is required at the ambient temperature Tg. FIG. 6 is a diagram illustrating an example of the fourth correlation data according to the present embodiment. The fourth correlation data indicates the target fan speed Fr4 of the fan 10 at which the hydraulic oil and the cooling water are optimally cooled at the certain ambient temperature Tg. At the certain ambient temperature Tg, the hydraulic oil and the cooling water are optimally cooled as the fan 10 is rotated at the target fan speed Fr4 corresponding to the ambient temperature Tg on the basis of the fourth correlation data.

The first correlation data, the second correlation data, the third correlation data, and the fourth correlation data are derived through an experiment or a simulation, and are stored in the storage device 60.

The target amount determination unit 52 derives the target fan speed Fr1 of the fan 10 on the basis of the engine speed N detected by the engine speed sensor 21 and acquired by the data acquisition unit 51, and the first correlation data stored in the storage device 60. Further, the calculation unit 52 derives the target fan speed Fr2 of the fan 10 on the basis of the engine water temperature Te detected by the engine water temperature sensor 22 and acquired by the data acquisition unit 51, and the second correlation data stored in the storage device 60. Further, the calculation unit 52 derives the target fan speed Fr3 of the fan 10 on the basis of the hydraulic oil temperature Ts detected by the hydraulic oil temperature sensor 23 and acquired by the data acquisition unit 51, and the third correlation data stored in the storage device 60. Further, the calculation unit 52 derives the target fan speed Fr4 of the fan 10 on the basis of the ambient temperature Tg detected by the ambient temperature sensor 24 and acquired by the data acquisition unit 51, and the fourth correlation data stored in the storage device 60.

The target amount determination unit 52 selects an arbitrary target fan speed from among the target fan speed Fr1, the target fan speed Fr2, the target fan speed Fr3, and the target fan speed Fr4, and determines the selected target fan speed as the final target fan speed Fr of the fan 10.

[Feedback Control]

Figure 7:
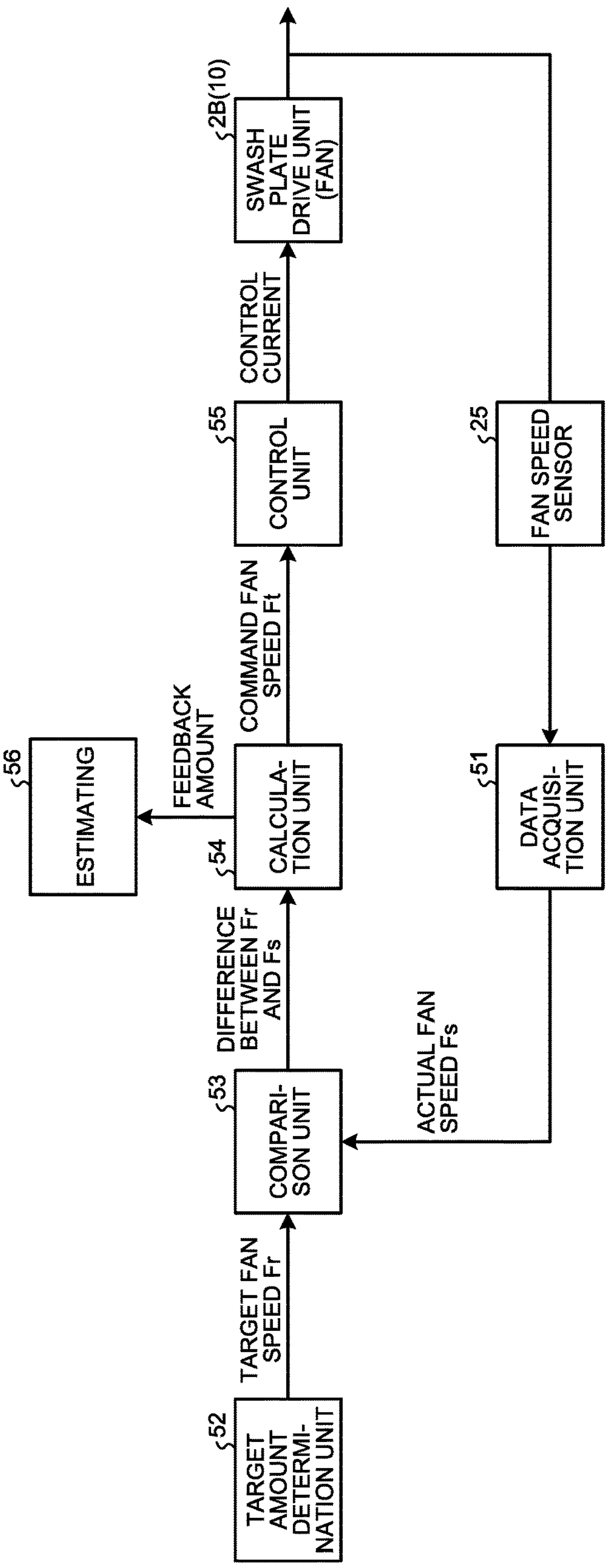
FIG. 7 is a control block diagram illustrating an example of a control device according to the first embodiment.

FIG. 7 is a control block diagram of the control device 50 according to the present embodiment. As illustrated in FIG. 7, the control device 5 controls the swash plate drive unit 2B by feedback control.

As described above, the target amount determination unit 52 determines the target fan speed Fr of the fan 10 on the basis of the engine speed data, the engine water temperature data, the hydraulic oil temperature data, and the ambient temperature data acquired by the data acquisition unit 51, and the first correlation data, the second correlation data, the third correlation data, and the fourth correlation data stored in the storage device 60. Further, the data acquisition unit 51 acquires the actual fan speed Fs of the fan 10 from the fan speed sensor 25. The comparison unit 53 calculates a difference between the target fan speed Fr and the actual fan speed Fs. The calculation unit 54 adds the difference between the target fan speed Fr and the actual fan speed Fs to the target fan speed Fr to determine a command fan speed Ft. The estimating unit 56 monitors a feedback amount that is a difference between the command fan speed Ft and the actual fan speed Fs, which is calculated by the comparison unit 53.

The calculation unit 54 calculates a flow demand Qr that indicates the necessary flow rate Q of the hydraulic oil to achieve the command fan speed Ft. As described above, the flow rate Q of the hydraulic oil supplied to the hydraulic motor 3 and the fan speed of the fan 10 are proportional. Therefore, the calculation unit 54 can calculates the flow demand Qr for achieving the command fan speed Ft.

The calculation unit 54 calculates the necessary capacity q of the hydraulic pump 2 to achieve the flow demand Qr. As described in the formula (1), the flow rate Q is changed on the basis of the engine speed N. Therefore, the calculation unit 52 can calculate the capacity q of the hydraulic pump 2 for achieving the flow demand Q on the basis of the current engine speed N acquired by the data acquisition unit 51 and the flow demand Q.

The control unit 55 calculates the control current i necessary for the swash plate drive unit 2B to achieve the capacity q calculated by the calculation unit 54. The angle of the swash plate 2A is adjusted on the basis of the control current i. When the angle of the swash plate 2A is adjusted, the capacity q of the hydraulic pump 2 is adjusted.

In the present embodiment, the storage device 60 stores fifth correlation data that indicates a relationship among the engine speed N, the flow demand Qr, and the control current i. In the present embodiment, the control unit 55 calculates the control current i for achieving the capacity q on the basis of the fifth correlation data stored in the storage device 60.

Figure 8:
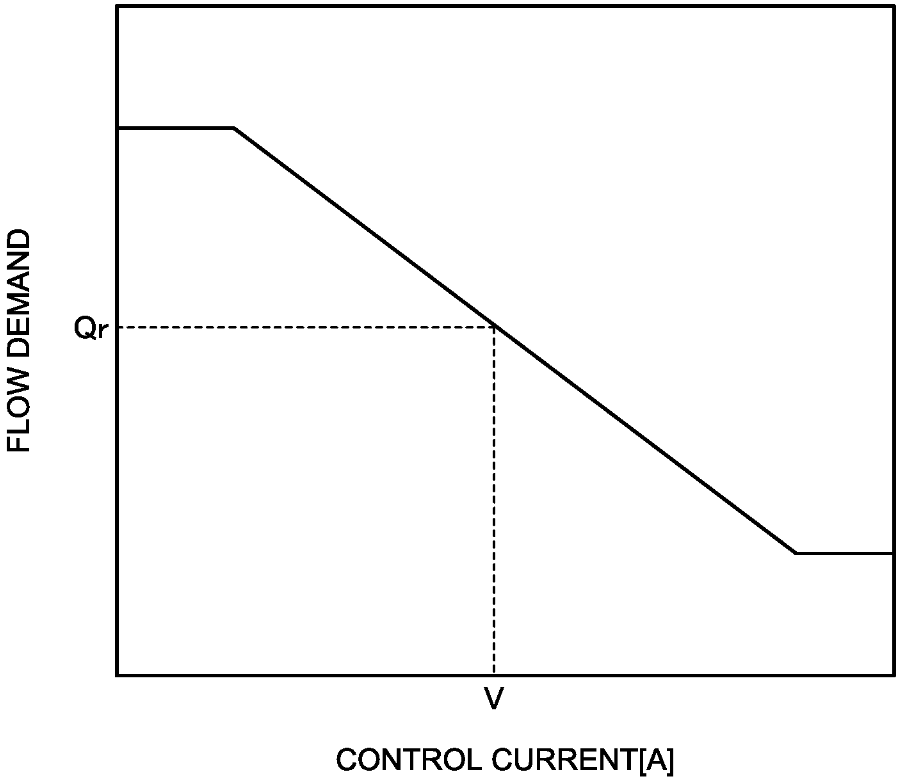
FIG. 8 is a diagram illustrating an example of fifth correlation data indicating a relationship between a flow demand and a control current according to the first embodiment.

FIG. 8 is a diagram illustrating an example of the fifth correlation data according to the present embodiment. The fifth correlation data that indicates the control current i for achieving the flow demand Qr at the certain engine speed N is stored in the storage device 60. The flow demand Q and the control current i are in a proportional relationship, for example.

The storage device 60 stores a large number of the fifth correlation data that indicates the control current i for achieving the flow demand Qr at a plurality of the engine speeds N(Na, Nb, Nc, . . . ), respectively. The control unit 55 calculates the control current i to be output to the swash plate drive unit 2B to achieve the command fan speed Ft of the fan 10 on the basis of the target fan speed Fr, the current engine speed N acquired by the data acquisition unit 51, and the fifth correlation data stored in the storage device 60. The control unit 55 outputs a control signal including the calculated control current i to the swash plate drive unit 2B.

[Feedback Amount]

In the fan drive system 100 as hydraulic equipment, when the hydraulic oil, the hydraulic pump 2, and the hydraulic motor 3 are in a normal state, the control current i is output from the control unit 54, so that the fan 10 is rotatable at the target fan speed Fr. The normal state of the hydraulic oil includes a state in which the hydraulic oil is brand-new, a state in which the hydraulic oil is not contaminated, a state in which the hydraulic oil is not deteriorated, and a state in which water is not mixed with the hydraulic oil. The normal state of the hydraulic pump 2 includes a state in which the hydraulic pump 2 is brand-new, a state in which the components of the hydraulic pump 2 are at a permissible wear level, a state in which the components of the hydraulic pump 2 are not deteriorated, and a state in which no water infiltrates the hydraulic pump 2. The normal state of the hydraulic motor 3 includes a state in which the hydraulic motor 3 is brand-new, a state in which the components of the hydraulic motor 3 are at a permissible wear level, a state in which the component of the hydraulic motor 3 are not deteriorated, and a state in which no water infiltrates the hydraulic motor 3.

When abnormality such as the contamination of the hydraulic oil, deterioration of the hydraulic oil, abrasion or deterioration of the components of the hydraulic pump 2 due to mixture of water to the hydraulic oil, and abrasion or deterioration of the components of the hydraulic motor 3 occur, the efficiency of the fan drive system 100 is decreased. If abnormality occurs in at least either the hydraulic pump 2 and the hydraulic motor 3, the fan 10 cannot be rotated at the target fan speed Fr and the actual fan speed Fs of the fan 10 becomes lower than the target fan speed Fr even if the control current i is output from the control unit 55. That is, if at least either the hydraulic pump 2 or the hydraulic motor 3 is in an abnormal state, the deviation between the actual fan speed Fs and the target fan speed Fr of the fan 10 becomes large even if the control current i is output from the control unit 54. In other words, the difference between the command fan speed Ft and the target fan speed Fr becomes large.

In the present embodiment, the estimating unit 56 estimates the system efficiency that indicates the product of the volume efficiency of the hydraulic pump 2 and the volume efficiency of the hydraulic motor 3 on the basis of a change of the feedback amount that indicates a deviation between the target fan speed Fr and the command fan speed Ft of the fan 10.

Figure 9:
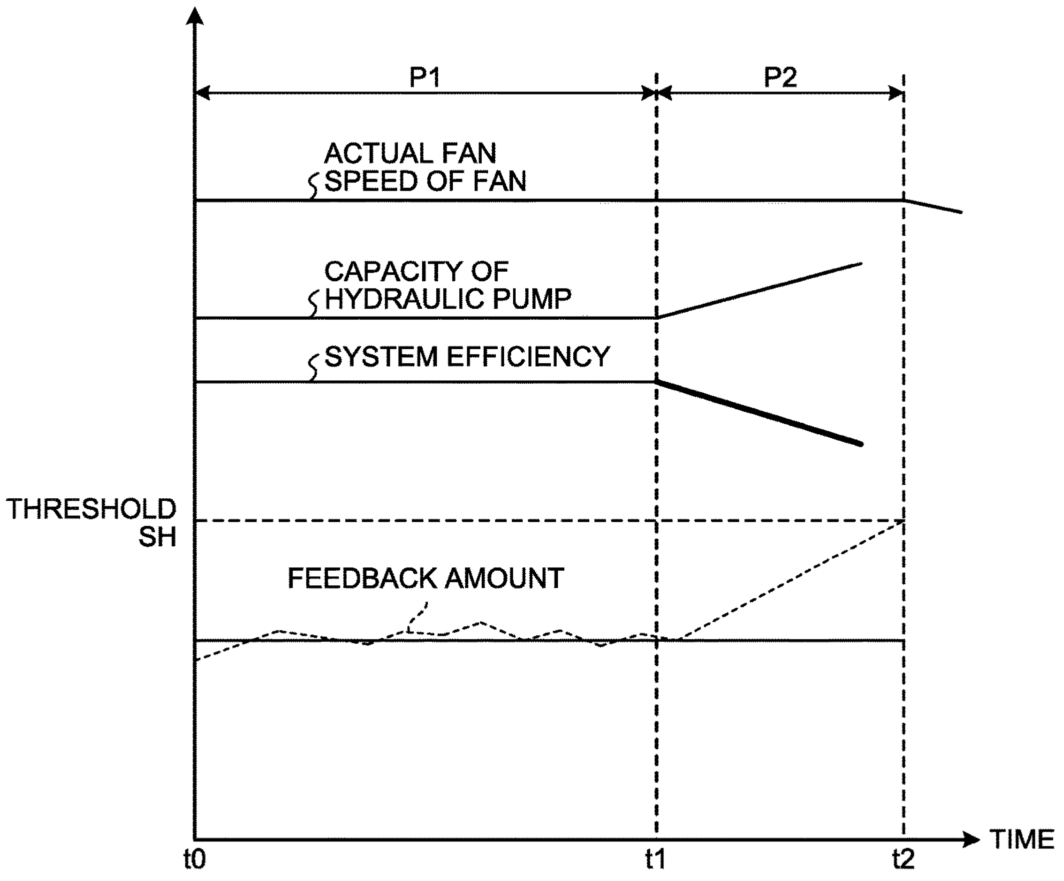
FIG. 9 is a diagram schematically illustrating relationships among a feedback amount, system efficiency, and an actual fan speed of the fan according to the first embodiment.

FIG. 9 is a diagram schematically illustrating relationships among the feedback amount, the system efficiency, the capacity of the hydraulic pump 2, and the actual fan speed Fs of the fan 10 according to the present embodiment. The estimating unit 56 monitors the feedback amount. The estimating unit 56 estimates the system efficiency on the basis of the change of the feedback amount.

As illustrated in FIG. 9, the feedback amount and the system efficiency correlate with each other. For example, during a period P1 between a point of time t0 when use of the brand-new hydraulic oil, the brand-new hydraulic pump 2, and the brand-new hydraulic motor 3 is started and a point of time t1 after the elapse of a predetermined time from the point of time t0, the feedback amount is nearly unchanged and is substantially constant. Further, during the period P1 where the feedback amount is constant, the estimating unit 56 can estimate that the system efficiency is normal on the basis of the change of the feedback amount. The system efficiency being normal means that the hydraulic oil, the hydraulic pump 2, and the hydraulic motor 3 are normal. Further, the system efficiency being normal means that the fan 10 is rotated according to the target fan speed Fr.

During a period P2 between the point of time t1 and a point of time t2 after the elapse of a predetermined time from the point of time t1, the feedback amount is increased. During the period P2 where the feedback amount is increased, the estimating unit 56 can estimate that the system efficiency is decreased on the basis of the change of the feedback amount. The system efficiency being decreased means that a possibility of occurrence of abnormality in at least one of the hydraulic oil, the hydraulic pump 2, and the hydraulic motor 3 is high. If the system efficiency is decreased during this period, the fan 10 can obtain the necessary actual fan speed Fs by an increase in the feedback amount.

The estimating unit 56 can estimate whether the abnormality has occurred in at least one of the hydraulic oil, the hydraulic pump 2, and the hydraulic motor 3 on the basis of a rate of change of the feedback amount that indicates a change amount of the feedback amount per unit time. For example, at the point of time t1, the feedback amount is sharply increased. Therefore, the estimating unit 56 can estimate that the abnormality has occurred in at least one of the hydraulic oil, the hydraulic pump 2, and the hydraulic motor 3 at the point of time t1.

Further, the estimating unit 56 estimates an optimum maintenance time of at least either the hydraulic pump 2 or the hydraulic motor 3 on the basis of the change of the feedback amount. The maintenance of the hydraulic pump 2 and the hydraulic motor 3 includes at least one of overhaul of the hydraulic pump 2, replacement of the hydraulic pump 2, overhaul of the hydraulic motor 3, and exchange of the hydraulic motor 3. Further, the maintenance includes replacement of the hydraulic oil.

In the present embodiment, a threshold SH about the feedback amount is defined. The estimating unit 56 estimates that the point of time t2 when the feedback amount has reached the threshold SH is the optimum maintenance time of at least either the hydraulic pump 2 or the hydraulic motor 3.

Further, the estimating unit 56 estimates the state of the hydraulic cylinder 202 or the state of the valve 203 on the basis of the change of the feedback amount.

[Control Method]

Figure 10:
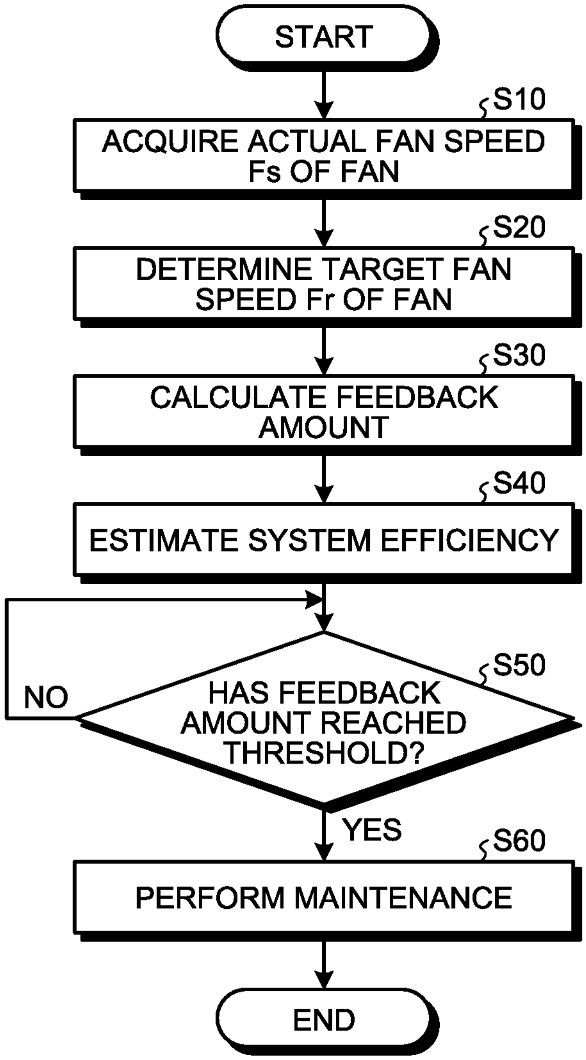
FIG. 10 is a flowchart illustrating an example of a method of controlling the fan drive system according to the first embodiment.

Next, a method of controlling the fan drive system 100 according to the present embodiment will be described. FIG. 10 is a flowchart illustrating an example of the method of controlling the fan drive system 100 according to the present embodiment.

The data acquisition unit 51 acquires the actual fan speed Fs of the fan 10 (Step S10). The target amount determination unit 52 determines the target fan speed Fr of the fan 10 on the basis of the states of the cooling water and the hydraulic oil as the objects to be cooled of the fan 10 (Step S20). The comparison unit 53 calculates the feedback amount that indicates the deviation between the target fan speed Fr and the actual fan speed Fs (Step S30).

The feedback amount includes the deviation between the target fan speed Fr and the command fan speed Ft. The estimating unit 56 monitors the feedback amount. The estimating unit 56 estimates the system efficiency of the fan drive system 10 on the basis of the change of the feedback amount (Step S40).

The estimating unit 56 determines whether the feedback amount has reached the threshold SH (Step S50). In Step S50, when the feedback amount is determined not to have reached the threshold (Step S50: No), the operation of the fan drive system 100 is continued. In Step S50, when the feedback amount is determined to have reached the threshold (Step S50: Yes), the maintenance of at least either the hydraulic pump 2 or the hydraulic motor 3 is performed (Step S60).

[Functions and Effects]

As described above, according to the present embodiment, the change of the feedback amount is monitored. Therefore, the state of the hydraulic pump 2 or the state of the hydraulic motor 3 can be estimated on the basis of the change of the feedback amount. In the present embodiment, the system efficiency of the fan drive system 100 that indicates the product of the volume efficiency of the hydraulic pump 2 and the volume efficiency of the hydraulic motor 3 can be estimated on the basis of the change of the feedback amount.

Therefore, whether the abnormality such as the contamination of the hydraulic oil, the deterioration of the hydraulic oil, mixture of water to the hydraulic oil, the abrasion or deterioration of the components of the hydraulic pump, and the abrasion or deterioration of the component of the hydraulic motor has occurred can be estimated on the basis of the estimated system efficiency. Since existence/nonexistence of the abnormality is estimated, the maintenance of the hydraulic pump 2 and the hydraulic motor 3 can be performed and the hydraulic oil can be replaced at an appropriate maintenance time, for example. Further, in the present embodiment, the contamination state of the hydraulic oil can be easily estimated by monitoring the change of the feedback amount without providing a contamination sensor or analyzing the hydraulic oil. Further, in the present embodiment, by grasping a proof stress difference between the fan drive hydraulic pump 2 and the hydraulic motor 3, an appropriate maintenance time of other hydraulic equipment that shares the hydraulic oil tank 6 can be estimated.

Further, in the present embodiment, the state of the hydraulic cylinder 202 or the state of the valve 203 can be estimated on the basis of the change of the feedback amount. In the present embodiment, the hydraulic pump 2 and the main hydraulic pump 200 share the hydraulic oil tank 6. That is, the hydraulic oil flowing in the hydraulic pump 2 and the hydraulic motor 3 also flows in the main hydraulic pump 200, the valve 200, and the hydraulic cylinder 200. Therefore, the state of the hydraulic cylinder 202 or the state of the valve 203 can be estimated on the basis of the feedback amount. Therefore, an appropriate maintenance time of the hydraulic cylinder 202 or an appropriate maintenance time of the valve 203 can be estimated.

Second Embodiment.

A second embodiment will be described. In the description below, the same or equivalent configuration element to that of the above-described embodiment is denoted with the same reference sign, and its description is simplified or omitted.

Figure 11:
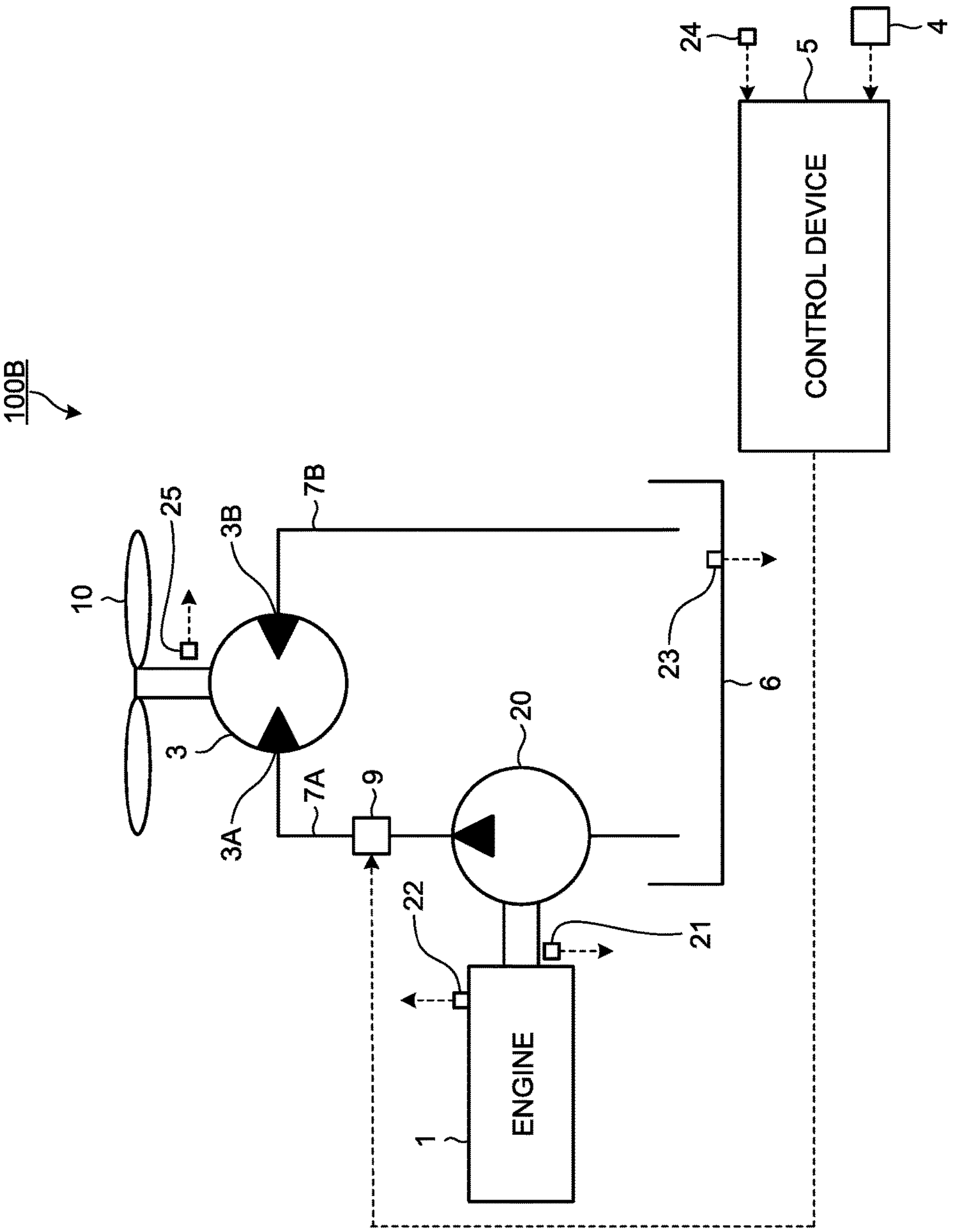
FIG. 11 is a diagram schematically illustrating an example of a fan drive system according to a second embodiment.

FIG. 11 is a diagram schematically illustrating an example of a fan drive system 100B according to the present embodiment. In the above-described embodiment, the fan drive hydraulic pump 2 is a variable displacement hydraulic pump, and the angle of the swash plate 2A is adjusted to adjust the flow rate of the hydraulic oil to be supplied from the hydraulic pump 2 to the hydraulic motor 3.

In the present embodiment, a hydraulic pump 20 is a fixed displacement hydraulic pump. In the present embodiment, a flow rate adjusting valve 9 that adjusts a flow rate of hydraulic oil to be supplied from the hydraulic pump 20 to a hydraulic motor 3 is provided in a pipeline 7A between the hydraulic pump 20 and the hydraulic motor 3. A control device 5 controls the flow rate adjusting valve 9 to adjust the flow rate of the hydraulic oil to be supplied from the hydraulic pump 20 to the hydraulic motor 3. When the flow rate of the hydraulic oil to be supplied from the hydraulic pump 20 to the hydraulic motor 3 is adjusted, a fan speed of a fan 10 is adjusted.

Third Embodiment.

A third embodiment will be described. In the description below, the same or equivalent configuration element to that of the above-described embodiments is denoted with the same reference sign, and its description is simplified or omitted.

In the present embodiment, an example of estimating an actual fan speed Fs of a fan 10 on the basis of a discharge pressure of a hydraulic pump 2 or an inflow port pressure of a hydraulic motor 3 will be described. In the present embodiment, a storage device 60 stores correlation data that indicates a relationship between the actual fan speed Fs of the fan 10, and the discharge pressure of the hydraulic pump 2 or the inflow port pressure of the hydraulic motor 3.

Figure 12:
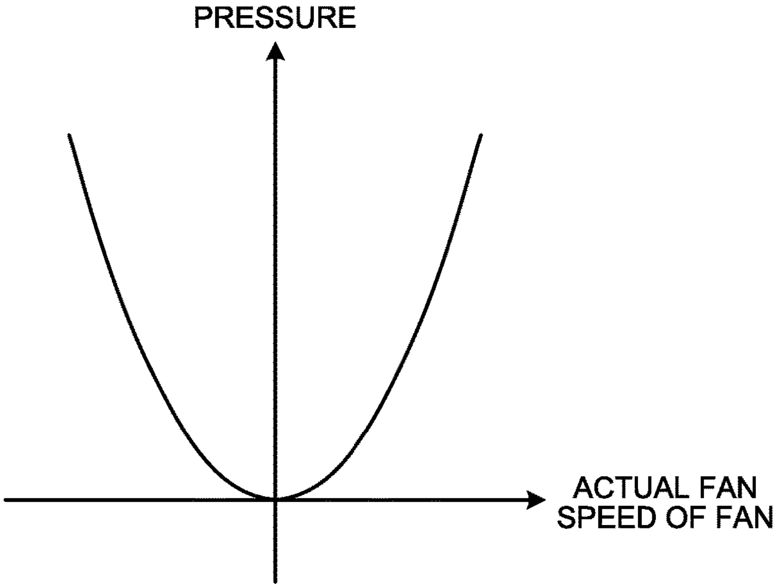
FIG. 12 is a diagram schematically illustrating an example of correlation data according to a third embodiment.

FIG. 12 is a diagram schematically illustrating an example of the correlation data stored in the storage device 60 according to the present embodiment. In FIG. 12, the horizontal axis represents the actual fan speed of the fan 10 and the vertical axis represents the discharge pressure of the hydraulic pump 2 or the inflow port pressure of the hydraulic motor 3. As illustrated in FIG. 12, a characteristic line diagram that indicates the relationship between the actual fan speed of the fan 10 and the pressure (static pressure) of the hydraulic oil can be drawn by a quadratic curve.

A data acquisition unit 51 acquires pressure data that indicates the discharge pressure of the hydraulic pump 2 detected by a discharge pressure sensor 26 or the inflow port pressure of the hydraulic motor 3 detected by an inflow port pressure sensor 27, in place of the actual fan speed Fs of the fan 10.

In the present embodiment, an estimating unit 56 estimates the actual fan speed Fs of the fan 10 on the basis of the correlation data stored in the storage device 60, and the pressure data of the hydraulic oil detected by the discharge pressure sensor 26 or the inflow port pressure sensor 27.

For example, the estimating unit 56 applies the discharge pressure (pressure) detected by the discharge pressure sensor 26 to the correlation data stored in the storage device 60, thereby to estimate the actual fan speed Fs of the fan 10. Similarly, the estimating unit 56 applies the inflow port pressure (pressure) detected by the inflow port pressure sensor 27 to the correlation data stored in the storage device 60, thereby to estimate the actual fan speed Fs of the fan 10.

Fourth Embodiment.

A fourth embodiment will be described. In the description below, the same or equivalent configuration element to that of the above-described embodiments is denoted with the same reference sign, and its description is simplified or omitted.

Figure 13:
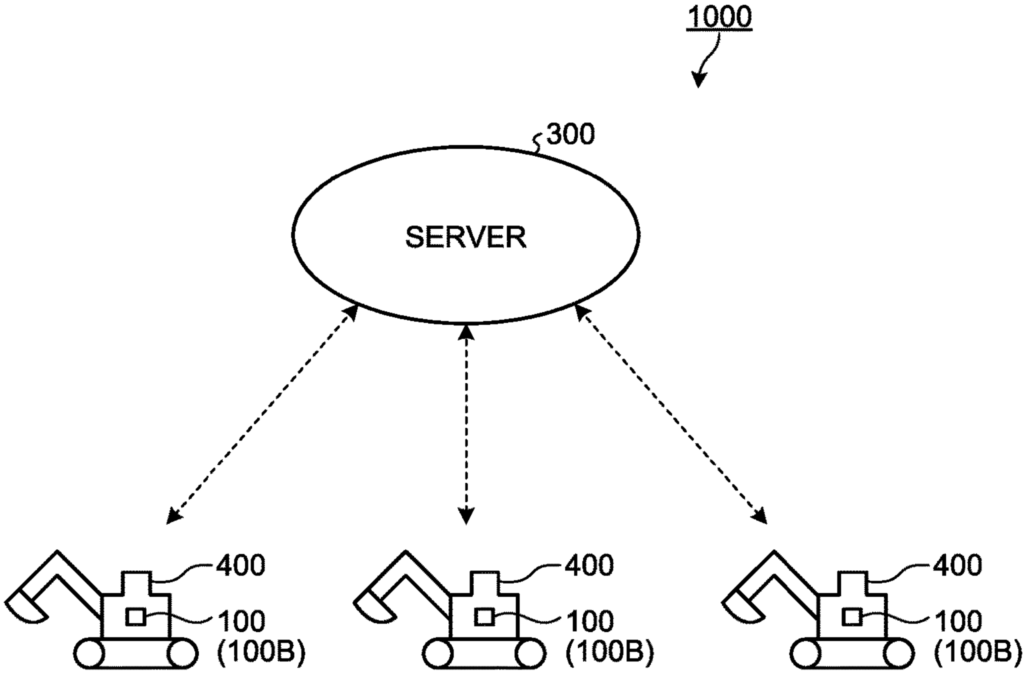
FIG. 13 is a diagram schematically illustrating an example of a management system according to a fourth embodiment.

FIG. 13 is a diagram schematically illustrating an example of a management system 1000 according to the present embodiment. As illustrated in FIG. 13, the fan drive systems 100 (100B) are mounted to a plurality of construction machines 400, respectively. The management system 1000 includes a server 300 that can perform data communication with each of the plurality of fan drive systems 100.

In the present embodiment, a part or all of functions of the control device 5 of the fan drive system 100 are provided in the server 300. In the present embodiment, at least the estimating unit 56 is provided in the server 300. Note that at least one of the data acquisition unit 51, the target amount determination unit 52, the comparison unit 53, the calculation unit 54, and the control unit 55 may be provided in the server 300. Since the server 300 can perform data communication with the fan drive system 100, the server 300 can acquire detection data of sensors provided in the construction machine 400 and other data from the construction machine 400.

The server 300 acquires a feedback amount from each of the plurality of fan drive systems 100. The server 300 compares a plurality of the feedback amounts respectively acquired from the plurality of fan drive systems 100 with one another, and extracts a specific fan drive system 100.

The server 300 extracts an abnormal fan drive system 100 as the specific fan drive system 100. Further, the server 300 extracts a fan drive system 100 in a favorable state as the specific fan drive system 100.

As described above, the server 300 can acquire the feedback amount about the fan drive system 100 from each of the plurality of construction machines 400, and can monitor a change of the respective feedback amounts of the plurality of fan drive systems 100. Further, the server 300 can estimate system efficiency of each of the plurality of fan drive systems 100 on the basis of the change of the feedback amount. The server 300 can extract the fan drive system 100 having a possibility of occurrence of abnormality and the fan drive system 100 in a favorable state on the basis of the estimated system efficiency.

Note that, in the present embodiment, the function of the estimating unit 56 may be provided in the control device 5 of the fan drive system 100 mounted in the construction machine 400.

REFERENCE SIGNS LIST

1 ENGINE
2 HYDRAULIC PUMP
2A SWASH PLATE
2B SWASH PLATE DRIVE UNIT
3 HYDRAULIC MOTOR

3A INFLOW PORT
3B OUTFLOW PORT
4 INPUT DEVICE
5 CONTROL DEVICE
6 HYDRAULIC OIL TANK
7A PIPELINE
7B PIPELINE
7C PIPELINE
8 CHECK VALVE
9 FLOW RATE ADJUSTING VALVE
10 FAN
20 HYDRAULIC PUMP
21 ENGINE SPEED SENSOR
22 ENGINE WATER TEMPERATURE SENSOR
23 HYDRAULIC OIL TEMPERATURE SENSOR
24 AMBIENT TEMPERATURE SENSOR
25 FAN SPEED SENSOR
26 DISCHARGE PRESSURE SENSOR
27 INFLOW PORT PRESSURE SENSOR
50 CALCULATION PROCESSING DEVICE
51 DATA ACQUISITION UNIT
52 TARGET AMOUNT DETERMINATION UNIT
53 COMPARISON UNIT
54 CALCULATION UNIT
55 CONTROL UNIT
56 ESTIMATION UNIT
60 STORAGE DEVICE
70 INPUT/OUTPUT INTERFACE DEVICE
100 FAN DRIVE SYSTEM
200 MAIN HYDRAULIC PUMP
201 PIPELINE
202 HYDRAULIC CYLINDER
203 VALVE
300 SERVER
400 CONSTRUCTION MACHINE
1000 MANAGEMENT SYSTEM

The invention claimed is:

1. A fan drive system comprising:

a hydraulic pump;

a hydraulic motor configured to rotate a fan on the basis of hydraulic oil supplied from the hydraulic pump;

a data acquisition unit configured to acquire an actual fan speed of the fan;

a target amount determination unit configured to determine a target fan speed of the fan on the basis of a state of an object to be cooled of the fan; and an estimating unit configured to estimate a state of the hydraulic pump or a state of the hydraulic motor on the basis of a change of a feedback amount indicating a deviation between the target fan speed and the actual fan speed.

2. The fan drive system according to claim 1, wherein the feedback amount includes a difference between the target fan speed and a command fan speed for controlling a swash plate drive unit of the hydraulic pump.

3. The fan drive system according to claim 1, wherein the state of the hydraulic pump or the state of the hydraulic motor includes system efficiency indicating a product of volume efficiency of the hydraulic pump and volume efficiency of the hydraulic motor.

4. The fan drive system according to claim 1, wherein the estimating unit estimates a maintenance time of at least either the hydraulic pump or the hydraulic motor on the basis of the change of the feedback amount.

5. The fan drive system according to claim 1, wherein the change of the feedback amount includes a rate of change indicating a change amount of the feedback amount per unit time, and the estimating unit estimates whether abnormality has occurred in at least one of the hydraulic oil, the hydraulic pump, and the hydraulic motor on the basis of the rate of change.

6. The fan drive system according to claim 1, comprising:

an actuator configured to be driven on the basis of the hydraulic oil; and a valve arranged in a pipeline in which the hydraulic oil flows, wherein the estimating unit estimates a state of the actuator or a state of the valve on the basis of the change of the feedback amount.

7. The fan drive system according to claim 1, comprising:

a storage device configured to store correlation data indicating a relationship between the actual fan speed of the fan and a discharge pressure of the hydraulic pump or an inflow port pressure of the hydraulic motor, wherein the data acquisition unit acquires pressure data indicating the discharge pressure of the hydraulic pump or the inflow port pressure of the hydraulic motor detected by a pressure sensor in place of the actual fan speed of the fan, and the estimating unit estimates the actual fan speed of the fan on the basis of the correlation data and the pressure data.

8. A management system, comprising:

a server configured to be able to communicate with the fan drive system according to claim 1, and configured to acquire a plurality of the feedback amounts from a plurality of the fan drive systems, respectively, wherein the server compares the feedback amounts respectively acquired from the fan drive systems with one another, and extracts a specific fan drive system.

9. A fan drive system comprising:

a hydraulic pump;

a hydraulic motor configured to rotate a fan on the basis of hydraulic oil supplied from the hydraulic pump;

a data acquisition unit configured to acquire an actual fan speed of the fan;

a target amount determination unit configured to determine a target fan speed of the fan on the basis of a state of an object to be cooled of the fan; and an estimating unit configured to estimate a state of the hydraulic pump or a state of the hydraulic motor on the basis of a change of a feedback amount indicating a deviation between the target fan speed and the actual fan speed, wherein the state of the hydraulic pump or the state of the hydraulic motor includes system efficiency indicating a product of volume efficiency of the hydraulic pump and volume efficiency of the hydraulic motor.

10. A management system, comprising:

a server configured to be able to communicate with a fan drive system, the fan drive system comprising:

a hydraulic pump;

a hydraulic motor configured to rotate a fan on the basis of hydraulic oil supplied from the hydraulic pump;

a data acquisition unit configured to acquire an actual fan speed of the fan;

a target amount determination unit configured to determine a target fan speed of the fan on the basis of a state of an object to be cooled of the fan; and an estimating unit configured to estimate a state of the hydraulic pump or a state of the hydraulic motor on the basis of a change of a feedback amount indicating a deviation between the target fan speed and the actual fan speed, wherein the server is configured to acquire a plurality of the feedback amounts from a plurality of the fan drive systems, respectively, and the server compares the feedback amounts respectively acquired from the fan drive systems with one another, and extracts a specific fan drive system.

* * * * *